Patented Oct. 8, 1935

2,016,537

UNITED STATES PATENT OFFICE 2,016,537

CALCIUM SULPHATE-ZINC SULPHIDE PIGMENT

James E. Booge, Newark, N. J., assignor to Krebs Pigment & Color Corporation, Newark, N. J., a corporation of Delaware No Drawing. Application January 30, 1932, Serial No. 589,980

7 Claims. (Cl. 134—78)

The present invention relates to calcium sulphate-zinc sulphide pigments obtained from zinc sulphate and a solution containing calcium and sulphide ions and to certain treatments of the raw co-precipitate of calcium sulphate and zinc sulphide.

A pigment obtained by calcination of a co-precipitate of calcium sulphate and zinc sulphide has been known for a number of years, but (strangely enough) it has never achieved any technical prominence and was never able to compete with the calcined co-precipitated barium sulphate-zinc sulphide pigments known as lithopones. This is due to the fact that the processes heretofore available have yielded pigments of such poor quality as to lack utility.

As early as 1877, H. Knight disclosed in his U. S. Patent 186,738 a pigment produced by reacting with a calcium polysulphide upon zinc sulphate. The reaction does not seem to be a simple one leading directly to a calcium sulphate-zinc sulphide co-precipitate, as the mother liquor of the first precipitate contains zinc compounds which can be precipitated with sodium sulphide and the mother liquors thereof when treated with calcium chloride precipitate calcium sulphate. A mixture of the three precipitates constitutes Knight's pigment.

In his U. S. Patent 251,187, dated December 20, 1881, J. Cawley discloses that the addition of magnesium oxide to the operation of calcining a "double salt", or what we call today a "co-precipitate", of zinc sulphide with barium or calcium sulphate produces a light non-sensitive white pigment of superior body or covering power. The co-precipitate is obtained according to this patent by metathesis of zinc sulphate and an "alkaline earthy sulphide".

In German Patent 74,591, of October 18, 1893, Steinau describes the production of a pigment by reacting at about 44° C. with a solution of calcium sulphide containing a polysulphide upon a solution of zinc sulphate and heating the precipitate to 250 to 300° C. This patent was abandoned shortly after its issuance.

The above processes made use of calcium polysulphides due to the insolubility of calcium sulphide in water. A pigment of acceptable color cannot be made from calcium polysulphide solution due to the large excess of sulphur and other impurities which are precipitated with the pigment.

At a more recent date it was suggested to produce a co-precipitate of zinc sulphide and calcium sulphate by reacting with a zinc sulphate solution upon solutions of sodium sulphide and calcium chloride. I am not aware that this process and the product obtained thereby has ever achieved commercial success. I believe that this is due to various drawbacks inherent in the process. Sodium sulphide is, compared to the cost of the sulphur ion in calcium sulphide, quite expensive. In addition, the reaction produces sodium chloride which tenaciously adheres to the precipitate and C. R. Steinau has already shown in U. S. Patent 955,918, April 26, 1910, that the presence of chlorides in straight lithopones, as well as in lithopones containing calcium compounds, causes the pigment to blacken, or become gray, when exposed to sunlight. Such a light sensitive pigment could, of course, not compete with the light-fast lithopones produced for a number of years.

The impossibility of preparing by the heretofore known processes a co-precipitated calcium sulphate-zinc sulphide pigment which, without adulterations, would produce by calcination a light-fast, pure white pigment of high covering power has prevented the pigment art from availing itself of the advantages such a pigment would have over lithopones.

I have for the first time been able to produce a calcium sulphate-zinc sulphide pigment which, for pigment purposes, is a full equivalent of lithopone, and my invention comprises a process of co-precipitating calcium sulphate and zinc sulphide by means of an easily soluble, pure calcium compound having available S ions, and treating it to give it pigmenting properties.

The calcium compound which I use in the reaction with the zinc salt is calcium hydrosulphide, and in its simplest form the reaction can be expressed by the formula

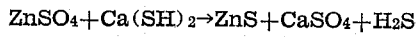
$$ZnSO_4 + Ca(SH)_2 \rightarrow ZnS + CaSO_4 + H_2S$$

This reaction leads to the formation of an equimolecular co-precipitate.

When using more than one molecular proportion of zinc sulphate a co-precipitate of a greater zinc sulphide content is obtained. The equation

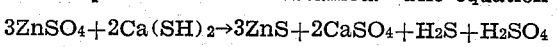
$$3ZnSO_4 + 2Ca(SH)_2 \rightarrow 3ZnS + 2CaSO_4 + H_2S + H_2SO_4$$

represents, for instance, the reaction producing a 3:2 zinc sulphide-calcium sulphate pigment.

The proportion of the pigment components can be established by this reaction at any point between 1:1 and 2:1 zinc sulphide:calcium sulphate.

The reaction in case of proportions greater than 1:1 produces free sulphuric acid, which tends to redissolve the zinc sulphide and the reaction is, therefore, to a certain extent reversible as, for instance, $$a\ ZnSO_4 + b\ Ca(SH)_2 \rightleftarrows a\ ZnS + b\ CaSO_4 + (2b-a)\ H_2S + (a-b)H_2SO_4$$

in which $a$ and $b$ are any desired numerals within the limitation that $a$ is greater than $b$, but less than $2b$.

In the case, therefore, of an acid precipitate it is indicated and preferred to neutralize the free acidity by the addition of any desired alkali, such as ammonia or soda ash, or even calcium carbonate or hydrated lime.

The co-precipitate obtained in this reaction is separated from the mother liquor, washed, dried and calcined whereby an inert, white and valuable pigment is obtained.

When finishing the co-precipitated zinc sulphide-calcium sulphate raw and uncalcined pigment according to standard practice as known in the lithopone art, I found that such operations will not yield a uniform pigment of entirely satisfactory properties, and that it would not compare in quality with a barium sulphate-zinc sulphide obtained in the corresponding manner. The reasons for this may be due to various causes. Calcium sulphate crystallizes with water of crystallization which is lost on calcination and the physical changes of the calcium sulphate crystals are on heating not necessarily the same as those taking place on calcination of anhydrous barium sulphate. It seems furthermore that the affinity of the zinc sulphide to be adsorbed upon barium sulphate, or vice versa, is different from that between zinc sulphide and precipitated calcium sulphate.

I have, however, found that an entirely satisfactory zinc sulphide-calcium sulphate pigment can be obtained by calcining a co-precipitate which has been prepared and treated in a certain manner which I now proceed to describe.

Among the various differences in the behavior of calcium and barium base pigments I found that co-precipitated zinc sulphide-calcium sulphate absorbs and tenaciously retains hydrogen sulphide. This absorbed hydrogen sulphide acts in an unexpected and detrimental manner upon the development of the pigmenting properties during calcination, and though it is not well understood in which manner the hydrogen sulphide can exert such an influence, its effect is very marked upon the color, tinting strength, hiding power, and uniformity of the calcined pigment.

I have found that the undesirable effects of this absorbed hydrogen sulphide can be completely overcome and eliminated. This is achieved by co-precipitating the pigment components under conditions which favor the evolution of the major part of the hydrogen sulphide and incidentally permit its recovery and reuse, and then removing the absorbed hydrosulphide. It is further advisable to avoid exposing the reaction mixture to air or oxidizing influences.

It is further advisable to adjust the strike, or end point, of the precipitation, after all volatile sulphur compounds have been removed, to a slight alkalinity by the addition of small amounts of an alkaline compound, such as caustic soda, calcium hydroxide, ammonia, zinc oxide, magnesia, etc. Zinc oxide is particularly useful for this purpose, as it will leave in the precipitate a very small but definite excess of a basic zinc compound.

The following is a description of a practical embodiment of my process of making a calcium sulphate-zinc sulphide co-precipitated pigment.

Calcium black ash as obtained by reduction of calcium sulphate in the well known manner is slurried in two to four parts of water and ground, preferably in a pebble mill, to about 100 mesh.

The so obtained slurry is then brought into intimate contact with hydrogen sulphide gas obtained in any desired manner.

This can be done, for instance, in a bubble tank under a pressure of from 30 to 60 lbs. The gas is readily absorbed and a solution of calcium hydrosulphide of about 20° Bé. can be obtained in this manner. I have also produced a similar solution by circulating a calcium black ash slurry by means of a pump and spray nozzle through a closed container containing hydrogen sulphide under slight pressure.

The so obtained calcium hydrosulphide liquor which may contain for practical purposes from 10 to 25% $Ca(SH)_2$ is filter pressed and is ready for precipitation of the raw pigment. Tests on the residue show less than 1% calcium sulphide remaining, indicating that the leaching is substantially complete.

The zinc liquor used for this purpose is entirely similar to that used in the manufacture of lithopones; that is to say, it should be of extreme purity while its concentration can be within very wide limits and the choice of the concentration is mainly influenced by economical considerations.

I can use three general methods of combining the two liquors to form the raw pigment precipitate. These comprise addition of the zinc liquor to a predetermined quantity of the calcium hydrosulphide solution; addition of the calcium solution to the predetermined amount of the zinc liquor; or simultaneous introduction of the two reactants into the strike vessel. Substantially equal quality has been obtained using these three methods.

Precipitation of the raw pigment is carried out in a closed vessel so equipped as to allow thorough agitation. The strike vessel is so designed as to withstand pressures up to fifty pounds per square inch generated by the evolution of hydrogen sulphide gas during the strike. The strike vessel is further equipped with a sampling device so that samples of the liquid or slurry can be withdrawn from time to time during the precipitation.

A calcium hydrosulphide liquor of, for instance, 15° Bé. strength (about 15% $Ca(SH)_2$), (14.6 liters) is introduced into the striking vessel. Ten and one-half liters of the zinc sulphate liquor, 36° Bé., is introduced into a blowcase and pressure applied to this blowcase so as to always maintain about five pounds higher pressure than is shown on the gauge on the striking vessel. By this means the zinc liquor is allowed to flow slowly into the calcium hydrosulphide liquor due to the slight excess of pressure in the blowcase.

The flow of zinc liquor is so regulated as to permit it all to be added within an average period of about thirty minutes. At the end of this time the strike end point should be obtained and should be between pH 5 and 6. The strike slurry is agitated during the entire time of the zinc addition.

A convenient means of determining the approximate end point may be had by noting the first indication of a pressure drop on the strike tank gauge due to the very much smaller evolution of $H_2S$ at this stage of the strike.

The $H_2S$ liberated by mixing the zinc and hydrosulphide liquors is piped from the strike container to a suitable absorption equipment. In my preferred modus operandi this H2S is conducted into slurry of calcium sulphide and water mixed in such proportions as to furnish, when completely gassed, a new supply of approximately 15° Bé. hydrosulphide liquor with which the next strike is prepared similarly to the above.

After completion of the strike and the pressure gauge has dropped to 0, a vacuum pump is connected to the strike container and the hydrogen sulphide gas is sucked out of the pigment slurry, the latter being agitated during this time. The H2S which is pulled off is exhausted into the aforementioned absorber. This evacuation is usually continued for a period of about thirty minutes.

The entire striking operation as outlined above is carried out at room temperature. It has been found that materially higher temperatures affect the strength of the resulting pigment although they do materially reduce the quantity of H2S held by the pigment. It is also known that lower temperatures do not show any material improvement in pigment properties. It has been found, however, that by striking at room temperature and then heating the strike to temperatures as high as 95° C., considerable H2S can be removed and still not seriously affect the pigment properties, as is the case when the strike itself is made at an elevated temperature.

Instead of carrying on the striking operation as a batch process, it is advantageous to do this continuously. For this purpose the zinc sulphate and calcium hydrosulphide solutions are introduced simultaneously into the striking vessel. This may be relatively small, only large enough to permit complete mixing and inter-action of the two solutions. The evolution of hydrogen sulphide will take place continuously and an exit pipe should be provided to bleed off this gas. From this small continuous striking vessel, the slurry containing the precipitated pigment is led continuously through an H2S removal system. This can be a small vessel of a type similar to the striking unit. In this part of the continuous system the slurry is subjected to reduced pressure to remove the H2S. At the same time the slurry may be heated to facilitate this removal. From this vessel the slurry passes to the final adjustment system where the residual H2S is neutralized and precipitated as zinc sulphide. This also may be done continuously or as a batch process in agitated tubs.

For convenience sake, the crude pigment slurry as obtained is removed from the pressure strike vessel into an ordinary wooden tub equipped with agitation. The so obtained raw pigment slurry contains substantial amounts of hydrogen sulphide absorbed upon the precipitate and it is in this form unsuited for heat treatment. I found that transforming this hydrogen sulphide into additional amounts of zinc sulphide precipitate offers the most practical and convenient manner of preparing the raw pigment for calcination. To effect this, I add alternately an alkali, such as sodium hydroxide, and zinc sulphate to the slurry, but in this operation I have to take care of maintaining the reaction of the liquor slightly on the alkaline side. The neutralization of absorbed hydrogen sulphide is, for instance, done by means of addition of 30% sodium hydroxide solution which is added to the raw slurry to neutralize the acidity and raise the pH above 7, and preferably to a pH of about 10 to 11.

Zinc liquor is then added but care should be taken that the pH of the raw slurry always remains between 10 and 11. In other words, an excess of alkali should always be maintained during this adjustment. If it is found that the pH has dropped to the neighborhood of 10 during the addition of zinc liquor, further sodium hydroxide is added followed by further zinc liquor addition and so on, until the sulphide reaction as shown with a nickel sulphate spot test shows a light buff color. At this stage is now becomes desirable to allow the pH to drop to the neighborhood of 9 to 9.5, which is accomplished by further slight additions of zinc liquor without any further additions of caustic. If the final adjustment is not exactly obtained, dilute sulphuric acid may be added if the pH is too high. Or, if by any chance, in bringing the pH down with zinc liquor, the resulting slurry no longer shows a test for sulphides, a small amount of sodium sulphide may be added to bring back the sulphide endpoint. When the proper adjustment is obtained a pH of 9 to 9.5 with the very faintest trace of nickel sulphide on the spot plate, should be obtained. The nickel sulphide test is made by placing a drop of the slurry on a porcelain spot plate and adding a drop of nickel sulphate solution.

All the solutions used in this adjustment, sodium hydroxide, zinc liquor, and if necessary, sodium sulphide and sulphuric acid, should be of the highest purity. After the above adjustment the raw slurry is ready for filtration and calcination. The average sodium hydroxide used on basis of dry pigment ranges from 3 to 5% as NaOH, 100%.

The slurry is then filtered and dried in the manner common with lithopone pigments.

The dried raw pigment is then heat treated, or calcined, at a temperature of about 700° C. following the procedures used in calcining barium sulphate-zinc sulphide pigments. The calcination should be carried out in a non-oxidizing atmosphere to avoid oxidation of the pigment. Such oxidation has the same effect as in the lithopone art where the quality of the pigment is spoiled by a substantially oxidizing atmosphere. When using equimolecular amounts of calcium hydrosulphide and zinc sulphate, a pigment is obtained containing in the average from 42 to 45% ZnS and less than .5% acetic acid soluble zinc as ZnO. After calcination in a substantially non-oxidizing atmosphere the pigments produced by my process contain above 0.1% ZnO and preferably from .15 to .35% ZnO, which latter limits have been found to give the best properties to the pigment. The prior art processes, all of which I have carefully tested, produce calcined pigments containing practically no ZnO and always below 0.1% ZnO. This low zinc oxide content is associated with the very poor quality of these prior art pigments.

If, due to a slightly different adjustment, the zinc oxide content of the calcined pigment should be above 0.35, its color would be lower but this can be corrected by an acid treatment whereby the zinc oxide content can be reduced and a satisfactory color obtained.

The exact calcination temperature is not especially important, good results are obtained within the preferred range of from 650 to 750° C. and even when these limits are exceeded in both directions, satisfactory results are still obtained.

The calcined quenched pigment is ground wet in a pebble mill and a pigment of satisfactory texture obtained.

In color and strength the pigment obtained by my novel process is far superior to any calcined, co-precipitated zinc sulphide-calcium sulphate pigment which can be made by heretofore known processes.

I have made a complete study of the prior art processes for production of zinc sulphide-calcium sulphate pigments, but have found that none of these yield a pigment having utility for applications in white paints. These prior art processes, as indicated above, were based upon use of calcium polysulphide solution with zinc sulphate or upon use of sodium sulphide, zinc sulphate and calcium chloride solutions. For comparison I am giving below results of representative pigments obtained by practice of these prior art processes.

Pigment #1 was produced by reacting with a calcium polysulphide upon zinc sulphate; #2 was obtained by reacting with sodium sulphide upon a solution containing the requisite amounts of zinc sulphate and calcium chloride; #3 is the pigment obtained by my novel process as described above.

| Pigment | Calcination temperature in degrees centigrade | Strength in the empirical scale described | Color in the empirical scale described | ZnS content percent | ZnO content percent |
|---|---|---|---|---|---|
| 1 | 650 | 134 | 2 | 42.0 | 0.0 |
| 1 | 700 | 152 | 3 | 42.0 | 0.0 |
| 2 | 650 | 127 | 8 | 42.0 | 0.05 |
| 2 | 700 | 135 | 8 | 42.0 | 0.02 |
| 3 | 700 | 158 | 14 | 43.0 | 0.28 |
| 3 | 750 | 162 | 13 | 43.0 | 0.32 |

The strength and color figures are obtained according to standard methods used for barium lithopone; a strength of 125 is commonly acceptable for equimolecular lithopone; any strength above 135 is a great improvement. On the color scale a #10 is the limit below which pigments do not have a degree of whiteness satisfactory for use in white paints. Figures of 2 or 3 indicate an off shade pigment, whereas pigments of a #8 color have a decidedly yellowish tint. #13 and 14 indicate a perfectly white pigment.

My novel process and pigment has been described in the above in regard to the production of an equimolecular calcium sulphate-zinc sulphide pigment; my process is, however, just as applicable to the production of pigments containing a larger amount, up to two molecular proportions of zinc sulphide. The same conditions relating to the endpoint of the precipitation, or strike, obtain in such operations. It will also be advantageous to carry out the precipitation at substantially ordinary temperature then remove any excess hydrogen sulphide and finish the strike at a slight alkalinity so as to obtain a slight zinc oxide content in the finished pigment.

The light-fastness of my novel pigments is excellent. As a general rule, the chlorine content of the raw material will unfavorably influence the light-fastness of the calcium sulphate-zinc sulphide pigment made therefrom. No chlorides are required in any of the steps of my novel process and by merely using pure materials I produce without other precautions a pigment of high light stability.

I claim:

1. In a process of making a white pigment the step of co-precipitating calcium sulphate and zinc sulphide by reacting with a solution of calcium hydrosulphide upon a solution of zinc sulphate and neutralizing the free acid formed in the reaction.

2. In a process of making a white pigment the steps of reacting with calcium hydrosulphide upon zinc sulphate in amounts of not more than two molecular amounts of zinc sulphate for each molecular amount of calcium hydrosulphide and eliminating the liberated hydrogen sulphide from the raw pigment slurry so that no hydrogen sulphide remains adsorbed upon the pigment.

3. The process of making a co-precipitate of zinc sulphide and calcium sulphate which comprises reacting in aqueous solution with calcium hydrosulphide upon zinc sulphate, separating the unabsorbed hydrogen sulphide from the reaction mixture and transforming the absorbed hydrogen sulphide into additional amounts of zinc sulphide.

4. The process of making a co-precipitate of zinc sulphide and calcium sulphate which comprises reacting in aqueous solution with calcium hydrosulphide upon zinc sulphate, neutralizing the free sulphuric acid formed in the reaction, separating the unabsorbed hydrogen sulphide from the reaction mixture and transforming the absorbed hydrogen sulphide into additional amounts of zinc sulphide.

5. The process of making a co-precipitate of zinc sulphide and calcium sulphate which comprises reacting in aqueous solution with calcium hydrosulphide upon zinc sulphate, removing the unabsorbed hydrogen sulphide, adjusting the slurry to an alkaline reaction and precipitating the soluble sulphide in the slurry with additional amounts of zinc sulphate.

6. The process of making a co-precipitate of zinc sulphide and calcium sulphate which comprises reacting at room temperature in aqueous solution in substantially equal molecular proportions with calcium hydrosulphide upon zinc sulphate, boiling off the unabsorbed hydrogen sulphide, neutralizing the absorbed hydrogen sulphide with a caustic alkali, reacting with a soluble zinc salt upon the so formed soluble sulphide while maintaining the slurry at a pH not substantially below 10, finally adjusting the slurry to a pH of about 9 to 9.5 and to a slight excess of soluble sulphide and separating the co-precipitate from the mother liquor.

7. In a process of making a white pigment the steps of co-precipitating calcium sulphate and zinc sulphide by reacting with a solution of calcium hydrosulphide upon a solution of zinc sulphate and eliminating the free acid formed in the reaction.

JAMES E. BOOGE.